US012791970B2

(12) United States Patent
Nogawa

(10) Patent No.: US 12,791,970 B2
(45) Date of Patent: Nov. 10, 2026

(54) RECORDING MEDIUM, METHOD, AND IMAGE FORMING SYSTEM THAT VISUALIZE STATUS OF PRINTING INTERRUPTION

(71) Applicant: Konica Minolta, Inc., Tokyo (JP)

(72) Inventor: Tetsuren Nogawa, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 28 days.

(21) Appl. No.: 18/969,819

(22) Filed: Dec. 5, 2024

(65) Prior Publication Data

US 2025/0181018 A1 Jun. 5, 2025

(30) Foreign Application Priority Data

Dec. 5, 2023 (JP) ................................. 2023-205641

(51) Int. Cl.
*G03G 15/00* (2006.01)

(52) U.S. Cl.
CPC ..... *G03G 15/5066* (2013.01); *G03G 15/5016* (2013.01)

(58) Field of Classification Search
USPC ............................................................ 399/75
See application file for complete search history.

(56) References Cited

U.S. PATENT DOCUMENTS 5,548,376 A * 8/1996 Kikuno .................... B65H 7/06 399/19
2006/0291871 A1* 12/2006 Yamaguchi ........ H04N 1/00037 399/8
2018/0091666 A1* 3/2018 Tachibana ............ G03G 15/502

FOREIGN PATENT DOCUMENTS

JP 2023-155923 A 10/2023

* cited by examiner

*Primary Examiner* — Quana Grainger
(74) *Attorney, Agent, or Firm* — Osha Bergman Watanabe & Burton LLP

(57) ABSTRACT

Disclosed is a non-transitory recording medium storing a computer-readable program, the program causing the computer to execute: acquiring a log from an image forming apparatus; determining whether a printing interruption time for each printing interruption exceeds a reference time based on the log acquired in the acquiring; creating display data in a display manner that allows recognition of a proportion of the printing interruption determined to exceed the reference time in the determining; and outputting the display data created in the creating.

10 Claims, 7 Drawing Sheets

FIG.4

IDENTIFICATION OF PRINTING INTERRUPTION FACTOR (UNIT: MINUTE)

LONGEST PRINTING INTERRUPTION TIME / SECOND LONGEST / THIRD LONGEST

| | 09/17 (SUN) | 09/18 (MON) | 09/19 (TUE) | 09/20 (WED) | 09/21 (THU) | 09/22 (FRI) | 09/23 (SAT) | TOTAL | INTERRUPTION TIME PER OCCURRENCE |
|---|---|---|---|---|---|---|---|---|---|
| ^ Col.1 | 188 | 103 | 108 | 149 | 126 | 169 | 124 | 967 | 16.7 |
| OUT OF PAPER | 122 | 81 | 81 | 118 | 59 | 25 | 70 | 556 | 17.4 |
| TRAY FULL | 66 | 22 | 27 | 31 | 67 | 144 | 54 | 411 | 15.8 |
| PAPER JAM | 0 | 0 | 0 | 0 | 0 | 0 | 0 | 0 | 0 |
| OUT OF TONER | 0 | 0 | 0 | 0 | 0 | 0 | 0 | 0 | 0 |
| OTHER CONVEYANCE ERROR | 0 | 0 | 0 | 0 | 0 | 0 | 0 | 0 | 0 |
| ^ Col.2 | 66 | 73 | 74 | 74 | 66 | 71 | 65 | 489 | 10.6 |
| OUT OF PAPER | 32 | 36 | 35 | 37 | 32 | 31 | 31 | 234 | 9 |
| TRAY FULL | 34 | 34 | 36 | 34 | 31 | 37 | 31 | 237 | 47.4 |
| PAPER JAM | 0 | 0 | 3 | 3 | 3 | 3 | 3 | 18 | 1.2 |

FIG.5

| No. | TIME OF ERROR OCCURRENCE | TIME OF RECOVERY FROM ERROR | ELIMINATION TIME | APPARATUS | JOB ID | PAPER TRAY | PAPER SIZE | PAPER TYPE | BASIS WEIGHT |
|---|---|---|---|---|---|---|---|---|---|
| 1 | 4/16/2023 4:01 | 4/16/2023 4:07 | 0:05:55 | C14000-8 | 2255 | TRAY 1 | A4 | AAAA | 81~91 |
| 2 | 4/16/2023 5:13 | 4/16/2023 5:17 | 0:04:14 | C14000-8 | 2255 | TRAY 1 | A4 | AAAA | 81~91 |
| 3 | 4/16/2023 6:28 | 4/16/2023 6:52 | 0:24:05 | C14000-8 | 2255 | TRAY 1 | A4 | AAAA | 81~91 |
| 4 | 4/16/2023 21:24 | 4/16/2023 21:59 | 0:35:40 | C14000-8 | 2258 | TRAY 1 | B4 | XXXX | 136~176 |
| 5 | 4/16/2023 22:41 | 4/16/2023 22:51 | 0:09:24 | C14000-8 | 2259 | TRAY 1 | B4 | XXXX | 136~176 |
| 6 | 4/17/2023 0:28 | 4/17/2023 1:04 | 0:36:18 | C14000-8 | 2263 | TRAY 1 | A3 | AAAA | 136~176 |
| 7 | 4/17/2023 1:38 | 4/17/2023 1:55 | 0:17:04 | C14000-8 | 2266 | TRAY 1 | A4 | AAAA | 136~176 |
| 8 | 4/17/2023 2:15 | 4/17/2023 2:33 | 0:17:42 | C14000-8 | 2266 | TRAY 1 | A4 | AAAA | 136~176 |
| 9 | 4/17/2023 4:07 | 4/17/2023 4:08 | 0:00:21 | C14000-8 | 2277 | — | — | — | — |
| 10 | 4/17/2023 4:10 | 4/17/2023 4:11 | 0:00:56 | C14000-8 | 2278 | TRAY 1 | A3 | AAAA | 136~176 |
| 11 | 4/17/2023 4:20 | 4/17/2023 4:48 | 0:27:50 | C14000-8 | 2278 | TRAY 1 | A3 | AAAA | 136~176 |
| 12 | 4/17/2023 12:10 | 4/17/2023 12:11 | 0:00:54 | C14000-8 | 2311 | TRAY 1 | — | — | — |
| 13 | 4/18/2023 3:53 | 4/18/2023 3:53 | 0:00:08 | C14000-8 | 2372 | — | — | — | — |
| 14 | 4/18/2023 5:05 | 4/18/2023 5:10 | 0:05:24 | C14000-8 | 2373 | — | — | — | — |
| 15 | 4/18/2023 16:23 | 4/18/2023 19:17 | 2:54:08 | C14000-8 | 2376 | TRAY 1 | B4 | XXXX | 106~135 |
| 16 | 4/20/2023 11:21 | 4/20/2023 11:21 | 0:00:01 | C14000-8 | 2442 | TRAY 1 | A3 | AAAA | 136~176 |
| 17 | 4/21/2023 14:34 | 4/21/2023 14:37 | 0:03:21 | C14000-8 | 2571 | TRAY 1 | B4 | XXXX | 136~176 |
| 18 | 4/25/2023 1:20 | 4/25/2023 1:27 | 0:07:19 | C14000-8 | 2750 | TRAY 1 | B4 | XXXX | 136~176 |
| 19 | 4/25/2023 2:07 | 4/25/2023 2:13 | 0:05:55 | C14000-8 | 2758 | — | — | — | — |
| 20 | 4/25/2023 2:22 | 4/25/2023 2:25 | 0:03:16 | C14000-8 | 2760 | TRAY 1 | A3 | AAAA | 136~176 |
| 21 | 4/25/2023 2:58 | 4/25/2023 3:02 | 0:04:20 | C14000-8 | 2765 | TRAY 1 | A4 | YYYY | 136~176 |
| 22 | 4/25/2023 3:50 | 4/25/2023 4:02 | 0:12:08 | C14000-8 | 2776 | TRAY 1 | A4 | YYYY | 136~176 |
| 23 | 4/25/2023 5:16 | 4/25/2023 5:26 | 0:09:52 | C14000-8 | 2790 | TRAY 1 | A4 | YYYY | 106~135 |
| 24 | 4/25/2023 5:48 | 4/25/2023 5:48 | 0:00:05 | C14000-8 | 2795 | — | — | — | — |
| 25 | 4/25/2023 6:05 | 4/25/2023 6:26 | 0:20:30 | C14000-8 | 2796 | TRAY 1 | B4 | AAAA | 106~135 |
| 26 | 4/25/2023 6:37 | 4/25/2023 6:54 | 0:16:57 | C14000-8 | 2796 | TRAY 1 | A4 | AAAA | 106~135 |
| 27 | 4/25/2023 11:52 | 4/25/2023 11:52 | 0:00:06 | C14000-8 | 2841 | TRAY 1 | A4 | XXXX | 177~216 |
| 28 | 4/25/2023 12:08 | 4/25/2023 12:08 | 0:00:09 | C14000-8 | 2844 | TRAY 1 | A3 | XXXX | 177~216 |
| 29 | 4/26/2023 15:45 | 4/26/2023 15:45 | 0:00:01 | C14000-8 | 2966 | TRAY 1 | A3 | XXXX | 106~135 |
| 30 | 4/26/2023 16:12 | 4/26/2023 16:14 | 0:02:36 | C14000-8 | 2970 | TRAY 1 | B4 | AAAA | 106~135 |
| 31 | 4/27/2023 11:43 | 4/27/2023 11:44 | 0:00:32 | C14000-8 | 3016 | TRAY 1 | — | — | — |
| 32 | 4/28/2023 3:19 | 4/28/2023 3:23 | 0:04:05 | C14000-8 | 3101 | TRAY 1 | A3 | ZZZZ | 106~135 |
| 33 | 4/28/2023 4:50 | 4/28/2023 4:52 | 0:02:21 | C14000-8 | 3120 | TRAY 1 | A4 | ZZZZ | 136~176 |
| 34 | 4/28/2023 17:13 | 4/28/2023 17:13 | 0:00:05 | C14000-8 | 3240 | TRAY 1 | B4 | AAAA | 92~105 |

FIG.6

| NUMBER OF OCCURRENCES | ELIMINATION TIME (2 MIN OR LONGER) | ELIMINATION TIME (5MIN OR LONGER) |
|---|---|---|
| 34 | 23(67%) | 16(47%) |

FIG.7

| ERROR OCCURRENCE TIME PERIOD | ELIMINATION TIME (PERCENTAGE EXCEEDING 5 MIN) |
|---|---|
| 12:00-13:00 | 67% |
| 17:00-18:00 | 20% |
| 22:00-3:00 | 80% |
| 6:00-9:00 | 10% |

FIG.8

| | | |
|---|---|---|
| | ELIMINATION TIME (PERCENTAGE EXCEEDING 5 MIN) | 80% |
| BREAKDOWN | PERCENTAGE OF NO OPERATION | 67% |
| | PERCENTAGE OF LONG ELIMINATION TIME | 13% |

RECORDING MEDIUM, METHOD, AND IMAGE FORMING SYSTEM THAT VISUALIZE STATUS OF PRINTING INTERRUPTION

BACKGROUND OF THE INVENTION

Technical Field

The present invention relates to a recording medium, a method, and an image forming system. In particular, the present invention relates to a technology for visualizing a status of printing interruption in an image forming apparatus.

Description of Related Art

If an error occurs during printing by a printer, the printing is interrupted, an operator is notified of an interruption factor, and the operator removes the interruption factor, thereby resuming the printing.

Although a countermeasure is taken each time an error occurs, frequent occurrence of an error, a long time required for coping with an error, and/or an error left alone lead/leads to an increase in printing interruption time, resulting in a decrease in productivity of print product.

For this reason, a printing company monitors an image forming apparatuses owned by the printing company, and aggregates and displays the number of errors, an interruption time, and the like in each image forming apparatus, thereby visualizing a status of printing interruption. Visualizing the status of printing interruption facilitates understanding of a cause, which can lead to a countermeasure.

JP 2023-155923A describes a technique for aggregating and displaying the number of interruptions and interruption time for each printing interruption factor in an image forming apparatus.

SUMMARY OF THE INVENTION

However, in the technique described in JP 2023-155923A, there is room for further improvement in grasping a cause from the aggregation result for each printing interruption factor and connecting the cause to a countermeasure.

In consideration of such a point, with regard to visualization of the status of printing interruption, an object of the present invention is to provide a recording medium, a method, and an image forming system capable of presenting information that can lead to easier understanding of a cause of the printing interruption and an appropriate countermeasure for the printing interruption.

To achieve at least one of the abovementioned objects, a recording medium reflecting one aspect of the present invention stores a computer-readable program, the program causing the computer to execute: acquiring a log from an image forming apparatus; determining whether a printing interruption time for each printing interruption exceeds a reference time based on the log acquired in the acquiring; creating display data in a display manner that allows recognition of a proportion of the printing interruption determined to exceed the reference time in the determining; and outputting the display data created in the creating.

To achieve at least one of the abovementioned objects, a method reflecting another aspect of the present invention comprises: acquiring a log from an image forming apparatus; determining whether a printing interruption time for each printing interruption exceeds a reference time based on the log acquired in the acquiring; creating display data in a display manner that allows recognition of a proportion of the printing interruption determined to exceed the reference time in the determining; and outputting the display data created in the creating.

To achieve at least one of the abovementioned objects, an image forming system reflecting yet another aspect of the present invention comprises: an image forming system, an information processing apparatus, and a display device. The information processing apparatus includes a hardware processor that: acquires a log from an image forming apparatus; determines whether a printing interruption time for each printing interruption exceeds a reference time based on the log acquired; creates display data in a display manner that allows recognition of a proportion of the printing interruption determined to exceed the reference time; and outputs the display data created. The display device displays the display data output from the information processing apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 4 is a diagram illustrating a display example (Example 2) in the image forming system according to the embodiment of the present invention;

FIG. 5 is a diagram illustrating a display example (Example 3) in the image forming system according to the embodiment of the present invention;

FIG. 6 is a diagram illustrating a display example (Example 4) in the image forming system according to the embodiment of the present invention;

FIG. 7 is a diagram illustrating a display example (Example 5) in the image forming system according to the embodiment of the present invention;

FIG. 8 is a diagram illustrating a display example (Example 6) in the image forming system according to the embodiment of the present invention.

DETAILED DESCRIPTION

Figure 1:
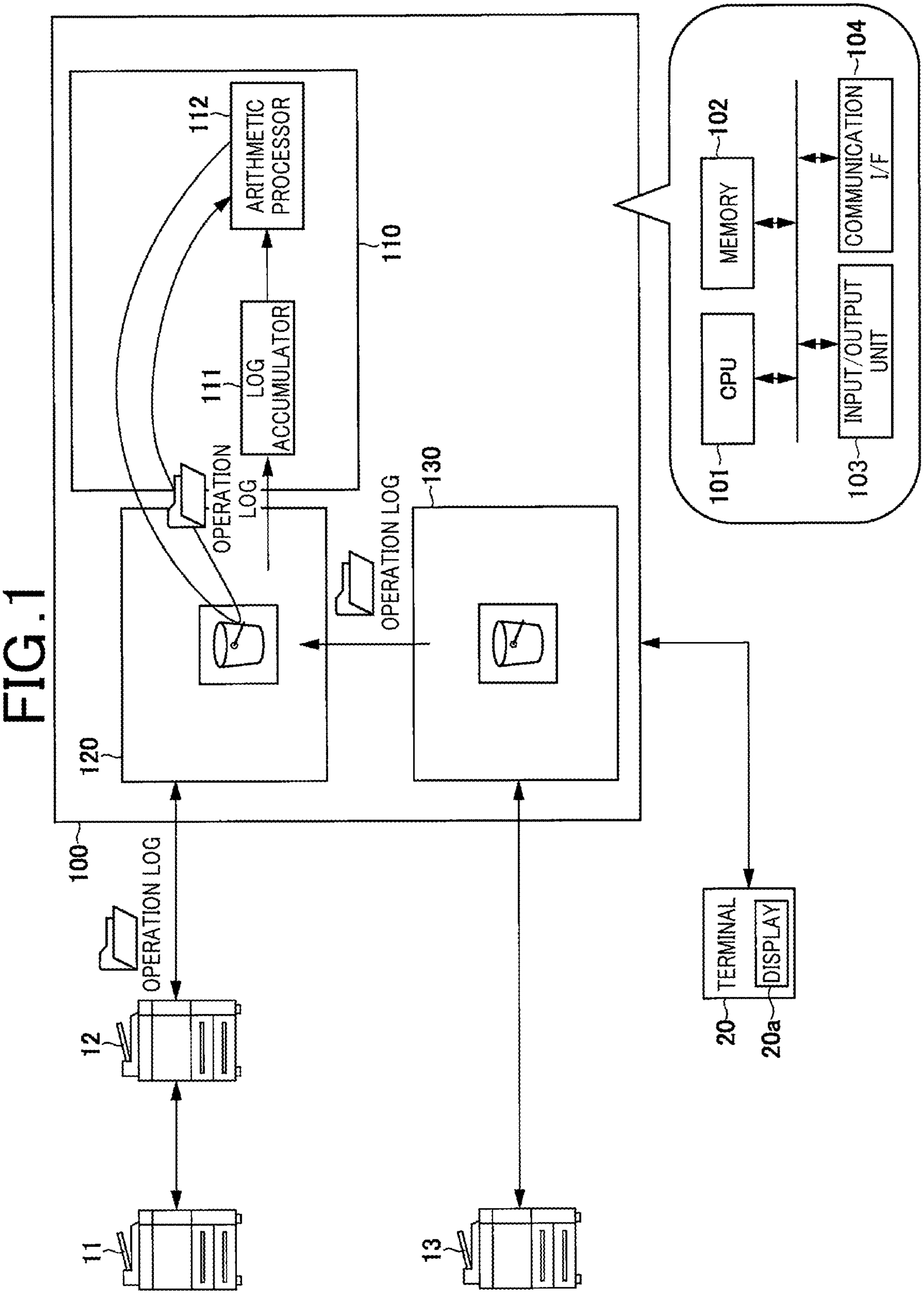
FIG. 1 is a configuration diagram illustrating an example of an image forming system according to an embodiment of the present invention.

Hereinafter, one or more embodiments of the present invention will be described with reference to the drawings. However, the scope of the invention is not limited to the disclosed embodiments. [Configuration of Image Forming System] FIG. 1 illustrates a configuration of an image forming system according to an embodiment of the present invention.

The image forming system according to the embodiment of the present invention is, for example, an image forming system constructed in a printing company, and a plurality of image forming apparatuses 11, 12, and 13 are connected to a server 100 via a network. A terminal (computer) 20 that displays an operation status, a printing status of a job, and the like of each of the image forming apparatuses 11, 12, and 13 is connected to the server 100 via a network. Note that although three image forming apparatuses 11 to 13 are illustrated in FIG. 1, a larger number of image forming apparatuses may be connected to the server 100. Further, the server 100 may be installed in the printing company (so-called on-premises) or may be installed in an external cloud.

The terminal 20 includes a display part 20*a*, and is operated by a manager, a production manager, or an on-site operator of the printing company to display, on the display unit 20*a*, the operation status, the printing status of a job, and the like of each of the image forming apparatuses 11, 12, and 13 transmitted from the server 100. As a result, error information, a downtime factor, and the like that reduce productivity can be grasped, and can be used to find an improvement point in a production process of a print product.

A display part of each of the image forming apparatuses 11, 12, and 13 may display the operation status, the printing status of a job, and the like of each of the image forming apparatuses 11, 12, and 13 transmitted from the server 100.

Each of the image forming apparatuses 11, 12, and 13 transmits an operation log indicating a printing operation status to the server 100 as needed. In FIG. 1, the image forming apparatus 11 and the image forming apparatus 12 are apparatuses belonging to the same group. The operation logs of the two image forming apparatuses 11 and 12 are packetized and transmitted to a packet receiver 120 of the server 100.

The operation log of the image forming apparatus 13 is packetized and transmitted to the packet receiver 130 of the server 100.

The server 100 includes the packet receivers 120 and 130, and an operation log analyzer 110. The operation log analyzer 110 includes a log accumulator 111 and an arithmetic processor 112.

The packet receivers 120 and 130 receive the operation logs from the image forming apparatuses 11, 12, and 13 as needed. The operation log includes data indicating a normal operation status such as printing start, printing end, and the number of printed sheets. The operation log also includes data at the time of printing interruption.

Note that the two packet receivers 120 and 130 are provided as an example, and the server 100 may receive all data by one packet receiver.

The log accumulator 111 accumulates the operation logs sent from each of the image forming apparatuses 11, 12, and 13.

The arithmetic processor 112 performs arithmetic processing of analyzing the operation logs accumulated by the log accumulator 111. Based on the analysis of the operation logs, the arithmetic processor 112 creates display data of an occurrence status of the printing interruption in each of the image forming apparatuses 11, 12, and 13. That is, the arithmetic processor 112 performs processes such as calculating a printing interruption time, creating a list, and highlighting the list. Details of these processes will be described below.

The display data created by the arithmetic processor 112 is transmitted to the terminal 20. Upon receiving the display data, the terminal 20 displays a screen based on the display data on the display part 20*a*. For example, the terminal 20 receives the display data from the server 100 by accessing the server 100 using a web browser.

Note that the display data created by the arithmetic processor 112 may be transmitted to each of the image forming apparatuses 11, 12, and 13 to display the display data on the display part of each of the image forming apparatuses 11, 12, and 13.

The server 100 includes a computer that is an information processing apparatus.

That is, as illustrated in FIG. 1, the server 100 includes a central processing unit (CPU; hardware processor) 101, a memory 102, an input/output unit 103, and a communication interface 104, which are connected to a bus.

The CPU 101 is an arithmetic processor that reads, from the memory 102, a program code of software that implements a function performed by the server 100 and executes the program code.

When the CPU 101 reads a program code from the memory 102 and executes arithmetic processing in a work area of the memory 102, various processing function units are configured in the memory 102. For example, the above-described operation log analyzer 110 is configured in the memory 102. Note that the memory 102 stores operation logs and display data.

Data for giving various instructions to the server 100 is input to the input/output unit 103. Furthermore, the input/output unit 103 outputs an instruction result or the like from the server 100.

The communication interface 104 communicates with other apparatuses via a network. For example, the communication interface 104 communicates with the terminal 20 that is a computer. Furthermore, the communication interface 104 communicates with the image forming apparatuses 11, 12, and 13 in order to receive operation logs and the like.

Example of Processing Operation Log by Server

Figure 2:
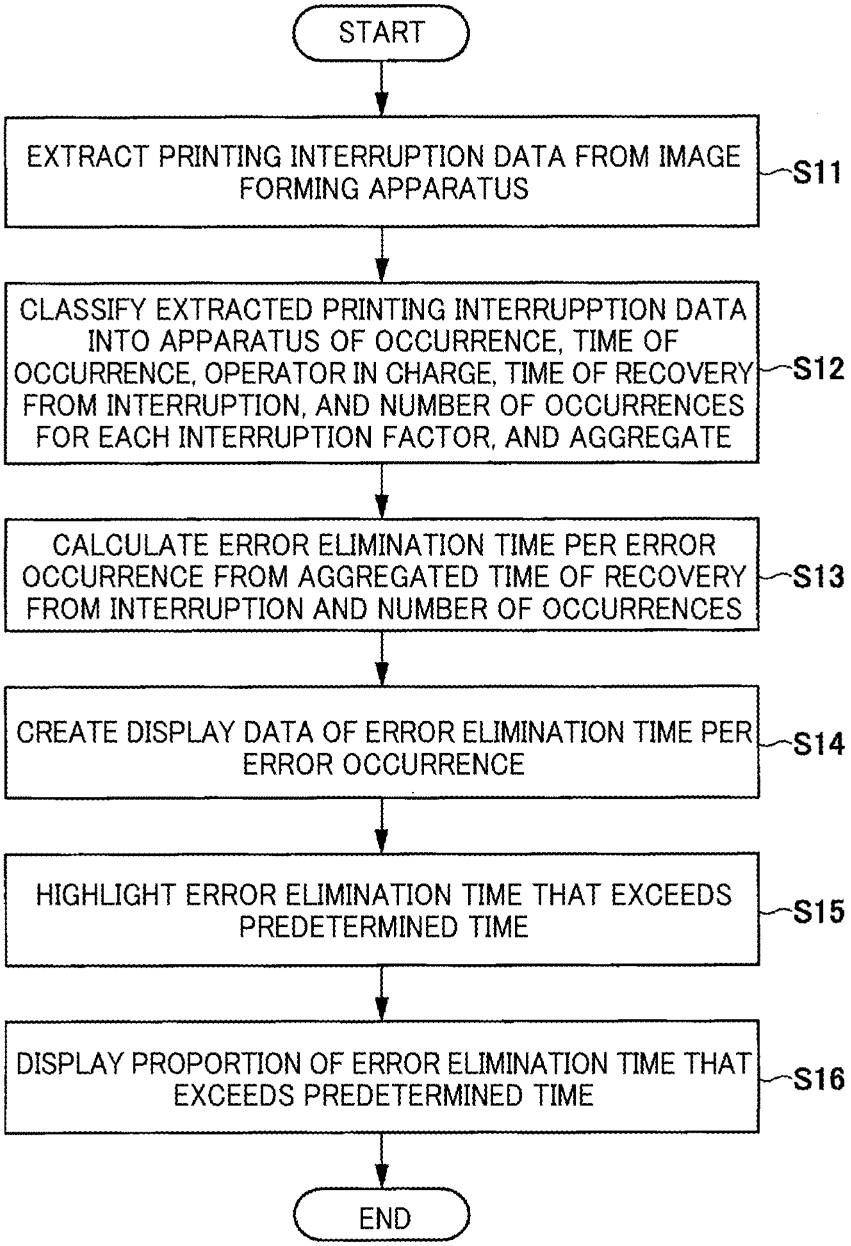
FIG. 2 is a flowchart showing an example of processing performed in the image forming system according to the embodiment of the present invention.

FIG. 2 is a flowchart illustrating an example of a procedure in which the server 100 acquires and processes operation logs.

First, the operation log analyzer 110 of the server 100 extracts printing interruption data from the operation logs accumulated by the log accumulator 111 (step S11). The printing interruption data is data indicating details when printing is stopped due to some error.

The operation log analyzer 110 classifies the extracted printing interruption data into an apparatus of occurrence, a time of occurrence, an operator in charge, a time of recovery from interruption, the number of occurrences, and the like for each interruption factor. Then, the operation log analyzer 110 performs an aggregation process of the classified result of the extracted printing interruption data (step S12).

Further, the operation log analyzer 110 performs a process of calculating an error elimination time per error occurrence in the printing interruption data obtained in the aggregation process (step S13). The error elimination time is a time period from a time of error occurrence to a time of recovery from the error and corresponds to a printing interruption time according to the present invention. Here, the error elimination time per error occurrence includes an error elimination time of each error and an average error elimination time of errors that occur in a predetermined period.

Then, the operation log analyzer 110 performs a display data creating process of the error elimination time per error occurrence (step S14). A specific example of the display data will be described with reference to FIG. 3 and subsequent drawings.

Here, the operation log analyzer 110 performs a process of highlighting an error elimination time that exceeds a predetermined time among the error elimination times indicated by the generated display data (step S15). Furthermore, the operation log analyzer 110 adds, to the display data, a table showing a percentage at which the error elimination time per error occurrence exceeds the predetermined time (step S16).

The display data on the printing interruption data generated by the operation log analyzer 110 is stored in the log accumulator 111. Then, the display data stored in the log accumulator 111 is transmitted to the terminal 20. Alternatively, the display data stored in the log accumulator 111 may be transmitted to the image forming apparatuses 11, 12, and 13.

The transmitted display data is displayed on the display part 20*a* of the terminal 20 or the like.

Display Examples

Next, display examples on the display part 20*a* of the terminal 20 or the like will be described. Note that each of the following examples changes to a display form of another example when, for example, an operator who is checking the display issues a display changing instruction to the server 100. Alternatively, the server 100 may collectively transmit display data of each display form to the terminal 20, and the display part 20*a* may select and display a display form from the received display data.

Figure 3:
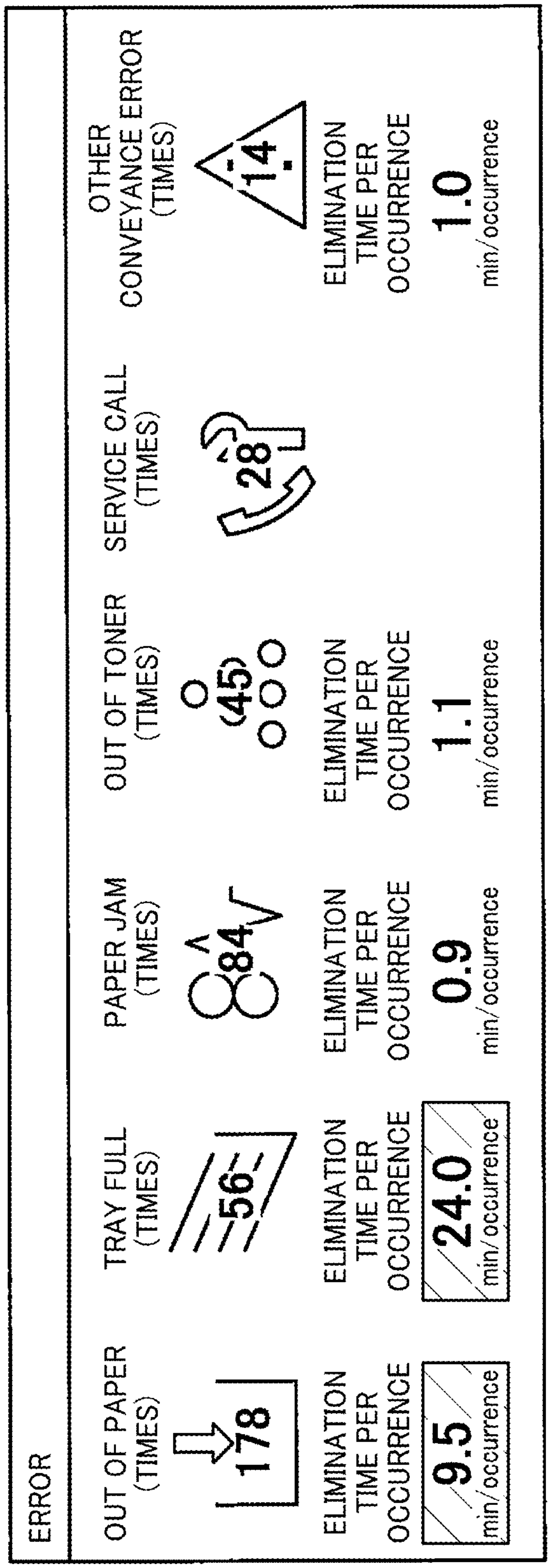
FIG. 3 is a diagram illustrating a display example (Example 1) in the image forming system according to the embodiment of the present invention.

FIG. 3 illustrates a display example (Example 1) of an analysis result of a particular image forming apparatus.

The example of FIG. 3 shows the number of occurrences for each error item and the average error elimination time per error occurrence when printing is interrupted due to an occurrence of some error in the image forming apparatus. The number of occurrences for each error item is, for example, the number of occurrences in a predetermined period such as a week or a month.

As the error items, out of paper (sheet), tray full, paper jam, out of toner, service call, and other conveyance errors are illustrated. The tray full indicates a state in which the sheet ejection tray becomes full of printed sheets. The out of toner indicates out of ink in the case of an inkjet method. The service call indicates a case where an abnormality code of the image forming apparatus has been issued. The abnormality code includes a case where it has been necessary to contact a company that performs maintenance and inspection. The service call may include a case where the image forming apparatus has automatically contacted the company that performs maintenance and inspection in response to detecting an error.

In the error items other than the service call, the average error elimination time per error occurrence is displayed.

In addition, in a case where the average error elimination time exceeds a predetermined time, the error elimination time is highlighted with a color or the like to indicate that it takes a longer time than a standard time to eliminate an error, thereby calling attention. The predetermined time corresponds to a reference time according to the present invention.

For example, when the average error elimination time exceeds two minutes, the display is shown in yellow, and when the average error elimination time exceeds five minutes, the display is shown in red, thereby calling attention of the operator of the terminal 20. In the example of FIG. 3, the out of paper and tray full items exceed five minutes, and a background color of a shaded area in FIG. 3 is changed to call attention. Note that the predetermined time of two minutes or five minutes may be set to a suitable value by the operator.

When the operator sets the predetermined time, data indicating the predetermined time is transmitted to the server 100 to be reflected at the time of error analysis in the server 100.

Note that the display shown in FIG. 3 is the analysis result for one image forming apparatus. On the other hand, in a case where a plurality of image forming apparatuses are installed in one site, the total number of error occurrences or the average error elimination time of the plurality of image forming apparatuses may be displayed.

Furthermore, in the display illustrated in FIG. 3, the longest error elimination time or the like may be displayed in addition to the average error elimination time.

FIG. 4 illustrates a display example (Example 2) of analysis results of particular image forming apparatuses. FIG. 4 illustrates analysis results of two image forming apparatuses of "Col. 1" and "Col. 2".

The example of FIG. 4 illustrates the total of printing interruption time (minutes) for each error item for each apparatus when printing is interrupted due to an occurrence of some error in the corresponding image forming apparatus. More specifically, the example of FIG. 4 illustrates the total printing interruption time for all errors for each day and the printing interruption time for each error item for each day, spanning one week. The example of FIG. 4 also shows the total printing interruption time for all errors for the week and the total printing interruption time for each error item for the week. Furthermore, the example of FIG. 4 also illustrates the average printing interruption time for all errors for the week and the average printing interruption time for each error item for the week.

In the example of FIG. 4, background colors of the longest printing interruption time, the second longest printing interruption time, and the third longest printing interruption time are changed. That is, in the example of FIG. 4, diagonal lines in the background or the like are used to indicate which is the first, second and third longest printing interruption time.

Although the background colors of the printing interruption times are changed in the example of FIG. 4, a text color may be changed instead of the background color. On the display screen, which background color (text color) indicates the first, second, and third is shown.

FIG. 5 illustrates a display example (Example 3) of an analysis result of a particular image forming apparatus.

The example of FIG. 5 is a display indicating details of the out of paper error item at the time of occurrence of each error. That is, a time of error occurrence, a time of recovery from the error, an error elimination time, an apparatus, a job, a paper tray, a paper size, a paper type, and a basis weight (weight of paper) are displayed. The error elimination time is a time period from a time of error occurrence to a time of recovery from the error and corresponds to the printing interruption time according to the present invention. The error elimination time is calculated by the server 100. Although the paper type is indicated by a symbol, a detailed name of the paper type may be displayed.

When creating display data of FIG. 5, the server 100 highlights an occurrence whose error elimination time exceeds a preset time by changing a background color. In FIG. 5, a shaded area is the highlighted portion. In the example of FIG. 5, error eliminating times exceeding two minutes (a first set time) and error eliminating times exceeding five minutes (a second set time) are displayed in a distinguished manner. The first set time corresponds to a first reference time of the present invention, and the second set time corresponds to a second reference time of the present invention. The server 100 may change a text color instead of the background color or change a text color at the same time as changing the background color.

In the example of FIG. 5, the background color only of the error elimination time column is changed, but the server 100 may change the background color or text color of all columns of an occurrence whose error elimination time exceeds the predetermined time.

With regard to each display item, the display range and the arrangement are selectable or changeable on the display screen via an operation by the operator. For example, regarding the paper tray, the paper size, the paper type, and the basis weight, only an error of a specific paper tray, paper size, paper type, and/or basis weight may be displayed. In addition, the error elimination times may be sorted and displayed in a descending or ascending order. When the error elimination times are sorted in a descending or ascending order, the proportion of occurrences whose error elimination time exceeds the predetermined time (two minutes or five minutes) can be grasped more easily. In this case, it is not always necessary to change the background color or the text color.

As illustrated in FIG. 5, by highlighting or sorting occurrences in a detailed error list, it is possible to roughly grasp the percentage of operations whose error elimination time is longer than the reference time. By providing such a visual impact, the production manager can encourage an on-site operator to improve his/her operation, for example.

FIG. 6 illustrates a display example (Example 4) of an analysis result of a particular image forming apparatus.

The example of FIG. 6 is obtained by calculating, based on the data of the example of FIG. 5, the number of error occurrences in a predetermined period, the number of error occurrences whose error elimination time exceeds two minutes (first predetermined time) and a percentage thereof, and the number of error occurrences whose error elimination time exceeds five minutes (second predetermined time) and a percentage thereof.

In the example of FIG. 6, only the out of paper error item is displayed, but other error items may also be displayed together.

Further, each image forming apparatus may change a text color or a background color when the percentage of error occurrences whose error elimination time exceeds the first predetermined time or the percentage of error occurrences whose error elimination time exceeds the second predetermined time exceeds a preset threshold value.

Displaying the analysis result illustrated in FIG. 6 makes it possible to further indicate to the operator only at a glance that there is a need for improvement than in FIG. 5.

FIG. 7 illustrates a display example (Example 5) of an analysis result of a particular image forming apparatus.

The example illustrated in FIG. 7 indicates, for each time period, the percentage of error occurrences whose error elimination time exceeds five minutes. To be specific, error occurrence time periods are indicated separately as 12:00-13:00, 17:00-18:00, 22:00-3:00, and 6:00-9:00. That is, in the example of FIG. 7, a lunch-break time period, an after-hours time period, a midnight time period, and an early morning time period are indicated. However, the time period division in FIG. 7 is an example, and all the time periods may be displayed. Also in this example, a text color or a background color may be changed to call attention to a time period in which the percentage of error occurrences whose error elimination time exceeds five minutes is high.

Displaying the analysis result illustrated in FIG. 7 makes it possible to encourage improvement such as a change in working time or work shift of an on-site operator.

FIG. 8 illustrates a display example (Example 6) of an analysis result of a particular image forming apparatus.

The example of FIG. 8 shows, among data for which the printing interruption time exceeds five minutes, a percentage at which no operation was performed for first five minutes, and a percentage at which an operation was started within the first five minutes but took time to eliminate an error.

The example of FIG. 8 shows that 80% of the error elimination times exceeds five minutes, no operation was performed for the first five minutes in 67% of the 80%, and an operation was started within the first five minutes but took time to eliminate an error in 13% of the 80%.

According to the display example illustrated in FIG. 8, it is found that a percentage at which an operator has left an error without noticing the error for some reason is high. Therefore, displaying the analysis result illustrated in FIG. 8 makes it clear that there is a problem in the operation of the operator.

Figure 9:
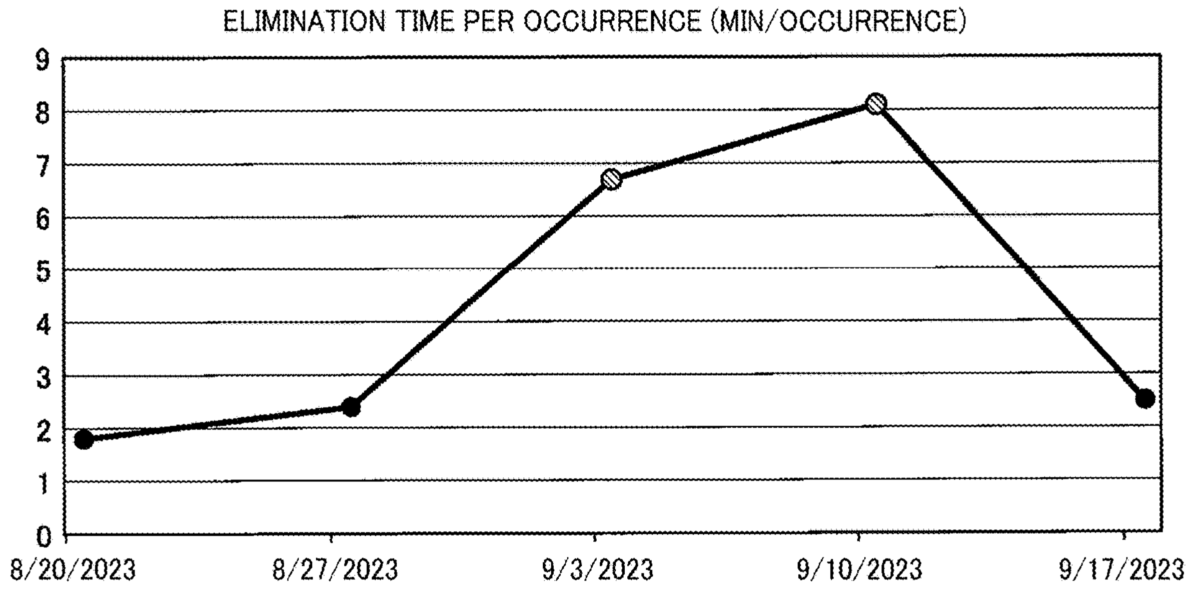
FIG. 9 is a diagram illustrating a display example (Example 7) in the image forming system according to the embodiment of the present invention.

FIG. 9 illustrates a display example (Example 7) of an analysis result of an image forming apparatus of a particular model.

In the example of FIG. 9, a change of the error elimination time per error occurrence averaged for a predetermined period (here, one week) is shown as a graph. The change of the error elimination time averaged for a week is an example, and a change of the error elimination time averaged for a day or a month may be displayed. Alternatively, a change of the maximum value of the error elimination time for a period may be indicated.

As shown in FIG. 9, by visualizing the change of the error elimination time per error occurrence for the predetermined period, a change trend of operation of an operator can be grasped. For example, the production manager can improve productivity by identifying a period in which a problem has occurred, looking back on the operation of the operator during that period, and improving the problem.

In the embodiment described above, the occurrence status of printing interruption in one or a limited number of image forming apparatuses is displayed. In contrast, for example, at a site where a large number of image forming apparatuses are operated, the occurrence status of printing interruption in the image forming apparatuses divided into groups may be displayed.

Although the display part that displays an interruption result is provided in the terminal connected to the server via a network, the interruption result may be displayed on an operation panel of the image forming apparatus. Furthermore, a management department separate from the site, a maintenance company of the image forming apparatus, or the like may obtain the display data from the server to display the display data.

A program that causes the server 100 to execute the processing procedure shown in the flowchart in FIG. 2 can be stored in a recording medium such as a memory of various types, an IC card, an SD card, or an optical disk.

In FIG. 1, the server 100 is illustrated as a single computer. In contrast, a plurality of servers (computers) may be prepared, and the processing may be distributed among the plurality of servers. For example, a server that accumulates operation logs may be different from a server that executes the arithmetic processing.

Furthermore, the use of a server is merely an example, and for example, operation logs may be stored in an image forming apparatus, and the image forming apparatus may analyze and process the operation logs. In this case, a result of analyzing the operation logs by the image forming apparatus can be directly displayed on a display part of the image forming apparatus or a display part of a terminal that manages the image forming apparatus.

Further, even when data acquired from the server 100 is displayed on an image forming apparatus or a terminal, part of the arithmetic processing may be executed by the image forming apparatus or the terminal.

According to the present invention, with regard to visualization of the state of printing interruption, it is possible to present information that can lead to easier understanding of a cause of the printing interruption and an appropriate countermeasure for the printing interruption. As a result, the printing interruption time can be reduced, and productivity can be improved.

Although embodiments of the present invention have been described and shown in detail, the disclosed embodiments are made for purposes of illustration and example only and not limitation. The scope of the present invention should be interpreted by terms of the appended claims.

The entire disclosure of Japanese Patent Application No. 2023-205641 filed on Dec. 5, 2023, is incorporated herein by reference in its entirety.

What is claimed is:

1. A non-transitory recording medium storing a computer-readable program, the program causing a computer to execute:

acquiring a log from an image forming apparatus;

determining whether a printing interruption time for each printing interruption exceeds a reference time based on the log acquired in the acquiring;

creating display data in a display manner that allows recognition of a proportion of the printing interruption determined to exceed the reference time in the determining; and outputting the display data created in the creating, wherein the program causes the computer to further execute calculating the proportion of the printing interruption determined to exceed the reference time in the determining, and the creating includes creating display data that includes the proportion calculated in the calculating.

2. The recording medium according to claim 1, wherein the creating includes creating a list of the printing interruption time for each printing interruption, and, among the printing interruption time in the list, displaying data of the printing interruption time exceeding the reference time in a manner distinguishable from data of the printing interruption time not exceeding or equal to the reference time.

3. The recording medium according to claim 2, wherein the creating include highlighting the data of the printing interruption time exceeding the reference time.

4. The recording medium according to claim 2, wherein the creating include rearranging data in the list in a descending or ascending order of the printing interruption time.

5. The recording medium according to claim 1, wherein the calculating includes calculating the proportion with respect to time of day, and the creating includes creating display data that includes the proportion with respect to the time of day calculated in the calculating.

6. The recording medium according to claim 1, wherein the calculating includes calculating:

the proportion of the printing interruption that exceeds the reference time due to no operation performed on the image forming apparatus in which the printing interruption has occurred; and the proportion of the printing interruption that exceeds the reference time while an operation is being performed on the image forming apparatus in which the printing interruption has occurred, and the creating includes creating display data that includes:

the proportion of the printing interruption that exceeds the reference time due to no operation performed; and the proportion of the printing interruption that exceeds the reference time while an operation is being performed calculated in the calculating.

7. A non-transitory recording medium storing a computer-readable program, the program causing a computer to execute:

acquiring a log from an image forming apparatus;

determining whether a printing interruption time for each printing interruption exceeds a reference time based on the log acquired in the acquiring;

creating display data in a display manner that allows recognition of a proportion of the printing interruption determined to exceed the reference time in the determining; and outputting the display data created in the creating, wherein the creating includes creating display data that includes a temporal change of the printing interruption time for each printing interruption averaged for every specified period.

8. The recording medium according to claim 1, wherein:

the reference time includes a first reference time, and a second reference time longer than the first reference time;

the determining includes determining whether the printing interruption time for each printing interruption exceeds the first reference time, and whether the printing interruption time for each printing interruption exceeds the second reference time; and the creating includes creating display data in a display manner that allows recognition of a proportion of the printing interruption exceeding the first reference time and a proportion of the printing interruption exceeding the second reference time.

9. A method comprising:

acquiring a log from an image forming apparatus;

determining whether a printing interruption time for each printing interruption exceeds a reference time based on the log acquired in the acquiring;

creating display data in a display manner that allows recognition of a proportion of the printing interruption determined to exceed the reference time in the determining; and outputting the display data created in the creating, wherein the method further includes calculating the proportion of the printing interruption determined to exceed the reference time in the determining, and the creating includes creating display data that includes the proportion calculated in the calculating.

10. An image forming system comprising:

an image forming apparatus;

an information processing apparatus including a hardware processor that:

acquires a log from an image forming apparatus;

determines whether a printing interruption time for each printing interruption exceeds a reference time based on the log acquired;

creates display data in a display manner that allows recognition of a proportion of the printing interruption determined to exceed the reference time; and outputs the display data created; and a display device that displays the display data output from the information processing apparatus, wherein the hardware processor further calculates the proportion of the printing interruption determined to exceed the reference time in the determining, and the creating includes creating display data that includes the proportion calculated in the calculating.

* * * * *